No. 724,607. PATENTED APR. 7, 1903.
L. PAGET.
BATTERY BOX OR OTHER RECEPTACLE.
APPLICATION FILED AUG. 28, 1901.
NO MODEL.

Inventor
Leonard Paget
by Philipp Sawyer Rice & Kennedy
Attys.

Attest:
J. A. Graves
J. F. Kehoe

UNITED STATES PATENT OFFICE.

LEONARD PAGET, OF NEW YORK, N. Y., ASSIGNOR, BY MESNE ASSIGNMENTS, TO CHARLES COSTER, OF NEW YORK, N. Y.

BATTERY BOX OR OTHER RECEPTACLE.

SPECIFICATION forming part of Letters Patent No. 724,607, dated April 7, 1903.

Application filed August 28, 1901. Serial No. 73,536. (No model.)

*To all whom it may concern:*

Be it known that I, LEONARD PAGET, a citizen of the United States, residing at New York city, county of New York, and State of New York, have invented certain new and useful Improvements in Battery Boxes or other Receptacles, fully described and represented in the following specification and the accompanying drawings, forming a part of the same.

The object of the present invention is to provide a light, strong, durable, and cheap receptacle or box which shall be inattackable by acid, and especially to provide such a receptacle which shall form an improved electric-battery box, being formed of material containing no electric-conducting material nor any material that will become conducting in battery use.

The invention includes an improved receptacle and electric-battery box.

As a full understanding of the invention can best be given by a detailed description of my improved receptacle and the preferred method of making it, such a description will now be given in connection with the accompanying drawings, showing the receptacle in a form convenient for a storage-battery box, and the features forming the invention will then be specifically pointed out in the claims.

Figure 1:
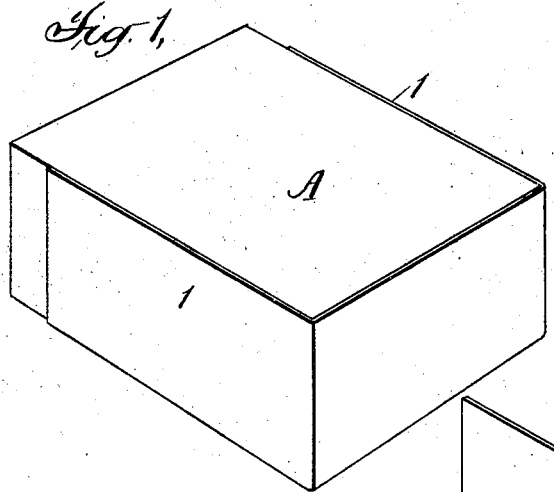
Figure 2:
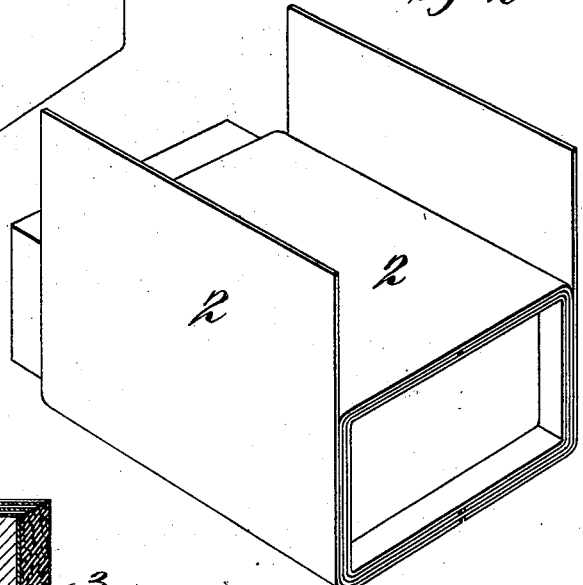
Figure 3:
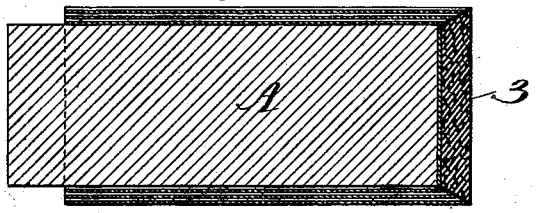
Figure 5:
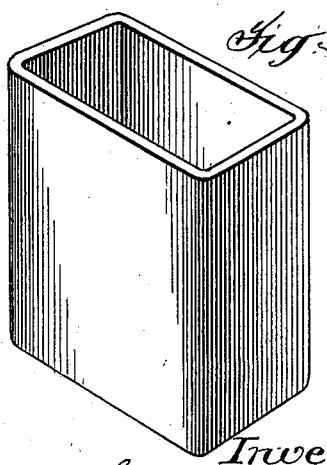
Figure 4:
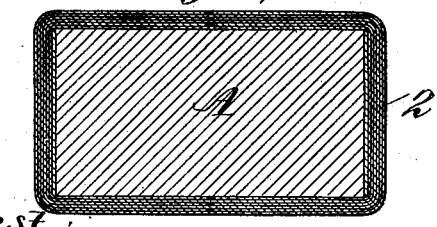

In the drawings, Figure 1 shows the first step in the making of the box. Fig. 2 shows the second step, putting on the side strips. Fig. 3 is a longitudinal section showing the completed box before the former is withdrawn. Fig. 4 is a cross-section of the same. Fig. 5 is a perspective of the completed box.

Referring now to said drawings, the method of making the box is as follows: A former A is used, which may be of wood, corresponding to the interior dimensions desired in the box, and a sheet 1 of any suitable paper, such as porous Manila paper, is first lapped around the bottom and two sides of the former, as shown in Fig. 1, the paper being treated with the compound hereinafter described. Sheets 2 of similar paper treated with the same compound are then wrapped around the sides of the box, five or six sheets being thus put on successively and preferably being applied so as to break joints with each other, as shown in Fig. 2. These sheets 2 are of such width and so applied as to form the depth of box required and to extend beyond the bottom of the box, as shown in Fig. 2, and thus form a space at the bottom of the box for the reception of compound, as hereinafter described. As the sheets are successively applied each is ironed down with a hot iron, so that the compound is thoroughly heated and the paper and the compound formed into a firm mass, making a strong durable wall for the box. The edges of the sheets 2 where they extend beyond the bottom of the former A are then cut at an angle, as shown in Fig. 3, so that the edge of each sheet is exposed to the compound which is filled into the space on the bottom of the box thus formed, and this space is then filled with a suitable compound similar to that with which the sheets are treated, which is simply poured in, so as to fill this space and form a thick bottom 3 of compound for the box. The former A is then withdrawn, leaving the box complete.

The requisites of the compound used in making the battery-box are that it shall contain such materials as to produce a firm dense tough durable structure when partially fused and combined with the paper and shall be inattackable by the battery-acids and contain no material that is conducting or rendered conducting by the battery action. If the receptacle is not to constitute a battery box or other receptacle for use where electrical action is to be considered, the presence or absence of conducting material may be immaterial.

The materials used in the compound may be varied somewhat; but I preferably use a compound formed of ozokerite, bitumen, and rosin-oil. Each of these and the resulting compound is inattackable by the battery-acids and contains no conducting material or material that will become conducting under the battery action. The rosin-oil is fusible at quite a low temperature, and thus penetrates and permeates the paper under the ironing heat. The bitumen is a cheap material of high insulating qualities and fusible only at a higher temperature, so as to form a coating on the outside of the paper, which prevents oxidation of or passage of acid to the saturated paper, while the ozokerite acts as a coherer in the structure. I have found that excellent results are secured with equal parts of bitumen and ozokerite and one-sixth of the combined weight of these materials in rosin-oil. These proportions, however, may be varied.

It will be seen that my box is clearly distinguished from boxes formed by vulcanizing before treatment with a shellac-enamel or the like. My box is not vulcanized, but depends for its efficiency on the saturation and coating of the paper by the more and less fusible constituents of the compound employed.

By my invention I secure a very light strong receptacle especially adapted for holding acids and as a storage-battery box in that it contains no material that is attackable by acid or that is rendered conducting by the battery action. My box also is very cheap and simple of construction and very durable.

What I claim is—

1. A receptacle formed of layers of paper treated with an acid-resisting compound combined with the paper as a whole under the action of heat, one of the constituents of said compound being more fusible and another less fusible, whereby the paper is saturated with the more fusible and coated or glazed with the less fusible constituents, one of the constituents of the compound acting also as a coherer for the several layers of paper, substantially as described.

2. A receptacle formed of layers of paper treated with an acid-resisting compound combined with the paper as a whole under the action of heat, one of the constituents of said compound being more fusible and another less fusible, whereby the paper is saturated with the more fusible and coated or glazed with the less fusible constituents, one of the constituents of the compound acting also as a coherer for the several layers of paper, and a thick bottom of compound, substantially as described.

3. A receptacle formed of layers of paper treated with an insulating compound inattackable by the battery-acids and combined with the paper as a whole under the action of heat, one of the constituents of said compound being more fusible and another less fusible, whereby the paper is saturated with the more fusible and coated or glazed with the less fusible constituents, one of the constituents of the compound acting also as a coherer for the several layers of paper, substantially as described.

4. A receptacle formed of layers of paper treated with a compound containing oil, bitumen and ozokerite and combined with the paper by heat, substantially as described.

5. A receptacle formed of layers of paper treated with an acid-resisting compound and containing more fusible material by which the paper is saturated and less fusible material forming a coating on the paper, the lower edges of the paper forming the side walls of the receptacle extending below the paper bottom of the receptacle, and a body of plastic compound filling the space formed by said walls below the paper bottom, substantially as described.

6. A receptacle formed of layers of paper treated with an acid-resisting compound and containing more fusible material by which the paper is saturated and less fusible material forming a coating on the paper, the lower edges of the paper forming the side walls of the receptacle extending below the paper bottom of the receptacle, and being trimmed at an angle from the outer edge inward so as to expose the edge of each layer, and a body of plastic compound filling the space formed by said walls below the paper bottom, substantially as described.

In testimony whereof I have hereunto set my hand in the presence of two subscribing witnesses.

LEONARD PAGET.

Witnesses:
C. J. SAWYER,
A. A. V. BOURKE.